US012434350B2

(12) United States Patent
Schaffer et al.

(10) Patent No.: US 12,434,350 B2
(45) Date of Patent: Oct. 7, 2025

(54) ATMOSPHERIC PRESSURE VENTURI INTERMIX REGULATOR CARTRIDGE AND EMISSION CONDUIT

(71) Applicant: AEROETCH HOLDINGS, INC., Danbury, CT (US)

(72) Inventors: Stephen Schaffer, Bethel, CT (US); Graves Kiely, Weston, CT (US)

(73) Assignee: AEROETCH HOLDINGS, INC., Danbury, CT (US)

( * ) Notice: Subject to any disclaimer, the term of this patent is extended or adjusted under 35 U.S.C. 154(b) by 658 days.

(21) Appl. No.: 17/689,390

(22) Filed: Mar. 8, 2022

(65) Prior Publication Data

US 2022/0281073 A1 Sep. 8, 2022

Related U.S. Application Data

(60) Provisional application No. 63/158,128, filed on Mar. 8, 2021.

(51) Int. Cl.
*B24C 7/00* (2006.01)
*B05B 7/14* (2006.01)
(Continued)

(52) U.S. Cl.
CPC .......... *B24C 7/0046* (2013.01); *B05B 7/1413* (2013.01); *B05B 15/65* (2018.02); *B24C 3/06* (2013.01)

(58) Field of Classification Search
CPC ....... B24C 3/06; B24C 7/0084; B24C 7/0046; B24B 5/02; B05B 15/65; B05B 7/1413
See application file for complete search history.

(56) References Cited

U.S. PATENT DOCUMENTS 709,448 A 9/1902 Shaver
1,036,871 A * 8/1912 Matheson .............. F16K 11/22 239/428

(Continued)

FOREIGN PATENT DOCUMENTS

DE 3624023 1/1987
EP 0712693 2/2000

(Continued)

OTHER PUBLICATIONS

International Search Report and Written Opinion from PCT/US22/19311 dated Jun. 1, 2022 (10 pages).

*Primary Examiner* — Joel D Crandall
(74) *Attorney, Agent, or Firm* — Falcon Rappaport & Berkman LLP

(57) ABSTRACT

A venturi cartridge regulating device for an air-particle dispensing system is provided, which is designed to be pre-assembled and installed in a chamber capable of atmospheric pressurization to regulate the required proportions of air and particle in a mixture formed upon activation by a propellant source and to direct a stream of a particle-gas mixture out of the chamber toward a targeted surface. The apparatus includes a chamber comprising a first plurality of inlet holes and a second plurality of inlet holes; and a conduit arranged at least partially within the chamber having a first opening arranged in the chamber. The first plurality of inlet holes is configured to intake a first substance, the second plurality of inlet holes is configured to intake a second substance, and a mixture of the first and second substances is created and mixture enters the conduit through the first opening.

16 Claims, 12 Drawing Sheets

(51) Int. Cl.
*B05B 15/65* (2018.01)
*B24C 3/06* (2006.01)

(56) References Cited

U.S. PATENT DOCUMENTS

| | | | |
|---|---|---|---|
| 1,948,533 A * | 2/1934 | Neely | B05B 7/12 |
| | | | 239/416.4 |
| 2,108,545 A | 2/1938 | Minich | |
| 2,133,149 A | 10/1938 | Poncelet | |
| 2,200,587 A * | 5/1940 | Tirrell | B22D 29/00 |
| | | | 451/90 |
| 2,441,441 A | 5/1948 | Paasche | |
| 2,526,403 A | 10/1950 | Paasche | |
| 2,574,578 A | 11/1951 | Martinet | |
| 2,725,684 A | 12/1955 | Crowe | |
| 3,032,929 A * | 5/1962 | Glesener | B24C 3/06 |
| | | | 451/90 |
| 3,163,963 A | 1/1965 | Caron | |
| 3,625,403 A | 12/1971 | Rousselot | |
| 3,626,841 A | 12/1971 | Schachter | |
| 3,704,811 A | 12/1972 | Harden, Jr. | |
| 3,852,918 A | 12/1974 | Black | |
| 4,045,915 A | 9/1977 | Gilbert et al. | |
| 4,090,334 A | 5/1978 | Kurowski et al. | |
| 4,233,785 A | 11/1980 | Abell | |
| 4,245,788 A | 1/1981 | Wright | |
| 4,281,485 A | 8/1981 | Charity, III | |
| 4,333,277 A | 6/1982 | Tasedan | |
| 4,369,607 A * | 1/1983 | Bruggeman | B24C 7/0084 |
| | | | 451/90 |
| 4,494,932 A | 1/1985 | Rzewinski | |
| 4,569,160 A | 2/1986 | Hengesbach | |
| 4,628,644 A | 12/1986 | Somers | |
| 4,674,239 A | 6/1987 | Jodoin | |
| 4,941,298 A | 7/1990 | Fernwood et al. | |
| 5,181,349 A | 1/1993 | Schaffer | |
| 5,514,026 A | 5/1996 | Schaffer | |
| 5,839,946 A | 11/1998 | Hertz | |
| 5,931,721 A | 8/1999 | Rose et al. | |
| 6,939,205 B2 | 9/2005 | Hopf et al. | |
| 7,387,140 B2 | 6/2008 | Brunn | |
| 7,547,292 B2 | 6/2009 | Sheldrake et al. | |
| 7,967,035 B2 | 6/2011 | Brunn | |
| RE43,824 E | 11/2012 | Sheldrake et al. | |
| 8,540,665 B2 | 9/2013 | Bates et al. | |
| 8,561,840 B2 | 10/2013 | Greer, Jr. et al. | |
| 8,622,255 B2 | 1/2014 | Greer, Jr. | |
| 8,657,516 B2 | 2/2014 | Cagnina et al. | |
| 9,044,546 B2 | 6/2015 | Bates et al. | |
| 9,307,880 B2 | 4/2016 | Cagnina et al. | |
| 9,358,338 B2 | 6/2016 | Bates et al. | |
| 10,239,185 B2 | 3/2019 | Schaffer et al. | |
| 2006/0205330 A1 | 9/2006 | Groman | |
| 2006/0211339 A1 | 9/2006 | Woods | |
| 2008/0233540 A1 | 9/2008 | Olmo et al. | |
| 2011/0056439 A1 | 3/2011 | Tobita et al. | |
| 2013/0056547 A1 | 3/2013 | Wilson et al. | |

FOREIGN PATENT DOCUMENTS

| | | |
|---|---|---|
| GB | 2102315 | 2/1983 |
| WO | 2001049455 | 7/2001 |
| WO | 2002011892 | 2/2002 |

\* cited by examiner

ATMOSPHERIC PRESSURE VENTURI INTERMIX REGULATOR CARTRIDGE AND EMISSION CONDUIT

CROSS-REFERENCE TO RELATED APPLICATIONS

The present application claims the benefit of U.S. Provisional Patent Application 63/158,128 filed Mar. 8, 2021, which is hereby incorporated by reference in its entirety.

BACKGROUND OF THE INVENTION

Various kinds and sizes of particulate abrasive delivery tools have been proposed in the past, including portable assemblies incorporating an abrasive hopper, a nozzle and a trigger for initiating the delivery of the abrasive stream, such as U.S. Pat. Nos. 4,941,298, 4,628,644, 3,163,963 and 2,133,149. However, each of these assemblies requires the addition of a remote source of compressed air or other pressurized driving gas to actuate the device.

Other proposals employ separate or remote hoppers of abrasive particles, such as U.S. Pat. Nos. 4,090,334 and 4,674,239, but again, these patents also employ remote sources of compressed air as the source of the driving fluid. German patent publication DE 3624023 A1 proposes several different "portable sandblaster" devices incorporating a container of compressed propellant gas, but these proposals lack valuable features and important advantages of the present invention.

Additional hand-held sandblasting devices such as those described in U.S. Pat. Nos. 5,514,026 and 5,181,349 also have a refillable hopper, which is attached to a pressurized propellant source which when operating, allows pressure into and up one of two delivery conduits into a venture chamber, so that when operating, it will cause aspiration in which an additional conduit delivers abrasive particles into the mixing chamber and outward through a nozzle towards an intended target. This type of operational method of a sandblaster is very inefficient, as a majority of the device's pressure is used to generate the venture in the nozzle's chamber to aspirate abrasive material into the ventures via a pickup conduit into this chamber, where it is mixed with pressure blown out of the exiting nozzle with little strength.

SUMMARY OF THE INVENTION

The present application relates to a venturi cartridge regulating device, which is designed to be pre-assembled and installed in a chamber capable of atmospheric pressurization to regulate the required proportions or ratios of air/particle intermix formed upon activation by an aerosol propellant or air compressor power source and to conduct a stream of a particle-gas mixture out of the chamber toward a targeted surface.

This assembly can be used for regulating the spray of predetermined amounts of particulate matter needing absolute proportions with a liquid, gas, or air mix, such as abrasives when used in a hand-held sandblaster powered by an aerosol propellant can or air-compressor based unit. The proportion of propellant to particulate for the spray intermix is regulated by the position, size, number, and ratio of holes from top to bottom in the cartridge, all of which can be modified according to the size of the housing as well as by the type of propellant and particulate. This venturi cartridge assembly is a stand-alone unit which can be easily installed with consistent results.

The cartridge configuration can be easily modified to work with a range of fine abrasives or particulate matter of comparably small size.

Other types of materials besides abrasives could be used, such as granular insecticides for spraying plants for example. Additionally, there are applications where a liquid may be controllably sprayed using an aerosol propellant can for smaller applications.

Various modifications of the venturi cartridges according to the present application can be produced according to the size of the overall unit the cartridge will be inserted into, as well as the type and size of particulate.

In accordance with a first aspect of the present application, an apparatus is provided. The apparatus includes a chamber comprising a first plurality of inlet holes and a second plurality of inlet holes; and a conduit arranged at least partially within the chamber having a first opening arranged in the chamber. The first plurality of inlet holes is configured to intake a first substance, the second plurality of inlet holes is configured to intake a second substance, and a mixture of the first and second substances is created within the chamber and the mixture enters the conduit through the first opening.

In accordance with various embodiments of the apparatus, the apparatus may include a threaded section configured to secure the apparatus to a container into which the chamber is inserted. The first plurality of inlet holes may be arranged longitudinally between the threaded section and the second plurality of inlet holes. In additional embodiments, the apparatus may comprise a conduit cap, which may include the threaded section thereon and is disposed atop the chamber. The conduit cap may further include a channel therethrough configured to receive the conduit therein.

In additional or alternative embodiments, the chamber includes a longitudinal wall having the first plurality of inlet holes and the second plurality of inlet holes formed therethrough. The chamber further may include a first cap covering a lower portion of the chamber and a second cap covering an upper portion of the chamber. The second cap further may include a cylindrical post extending from a surface of the second cap and may include a passage therethrough through which the conduit passes.

In additional or alternative embodiments, the apparatus comprises an external barrel positioned over the longitudinal wall comprising a first plurality of barrel inlet holes. The external barrel is configured for rotation about the chamber between a first position in which the first plurality of barrel inlet holes overlaps with the first plurality of inlet holes and a second position in which the first plurality of barrel inlet holes do not overlap with the first plurality of inlet holes. In further embodiments, the external barrel may also comprise a second plurality of barrel inlet holes, and in the first position the second plurality of barrel inlet holes overlap with the second plurality of inlet holes and in the second position the second plurality of barrel inlet holes do not overlap with the second plurality of inlet holes.

In accordance with additional or alternative embodiments, the conduit includes a second opening opposite the first opening and arranged outside of the chamber, the second opening configured to be connected to a delivery conduit. The first plurality of inlet holes is disposed adjacent to a first end of the chamber and the second plurality of inlet holes is disposed adjacent to a second end of the chamber. Additionally, the first plurality of inlet holes may comprise a greater number of inlet holes than the second plurality of inlet holes.

In accordance with a second aspect of the present application, a system is provided. The system comprises a first chamber, which may include a propellant conduit configured to receive a propellant substance, and a containment area configured to hold a particulate substance. The system further comprises an apparatus inserted into the first chamber, which comprises a second chamber comprising a first plurality of inlet holes and a second plurality of inlet holes, and a conduit arranged at least partially within the second chamber having a first opening arranged in the second chamber. The first plurality of inlet holes is configured to intake the propellant substance into the second chamber, the second plurality of inlet holes is configured to intake the particulate substance into the second chamber, and a mixture of the propellant substance and the particulate substance is created within the second chamber and the mixture enters the conduit through the first opening.

Various implementations of the system may include one or more of the following features, separately or in combination. The apparatus of the system further may include a threaded section configured to secure the apparatus to the first chamber, and the first chamber may include a corresponding threaded section. The first plurality of inlet holes and the second plurality of inlet holes can both be disposed within the containment area of the first chamber. The second chamber further may include a longitudinal wall having the first plurality of inlet holes and the second plurality of inlet holes formed therethrough.

The apparatus further may include a conduit cap configured to secure the apparatus to the first chamber, and the conduit cap may include a channel therethrough configured to receive the conduit therein; and one or more sealing elements arranged outside of the first chamber configured to provide a seal of the containment area of the first chamber. The first plurality of inlet holes may be disposed adjacent to a first end of the second chamber and arranged in a lower portion of the containment area, and the second plurality of inlet holes can be disposed adjacent to a second end of the second chamber arranged in an upper portion of the containment area.

The propellant conduit may be configured to be connected to a pressurized gas source, and the propellant substance is the pressurized gas. The first chamber further may include a one-way flow valve adjacent to the propellant conduit configured to prevent flow of the propellant substance towards the pressurized gas source; and a filter configured to filter the propellant substance from the pressurized gas source.

DETAILED DESCRIPTION OF THE FIGURES

Figure 1A:
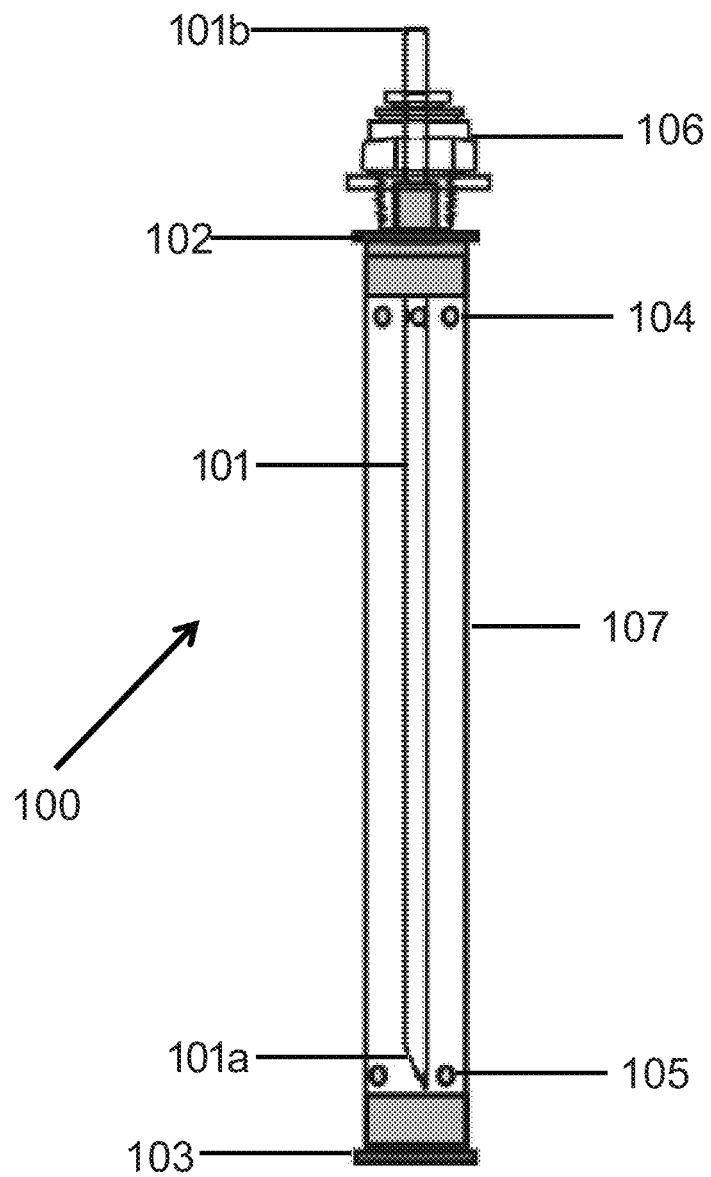
FIG. 1A shows a cross-sectional view of the intermix regulator cartridge according to an embodiment of the present application.
Figure 1B:
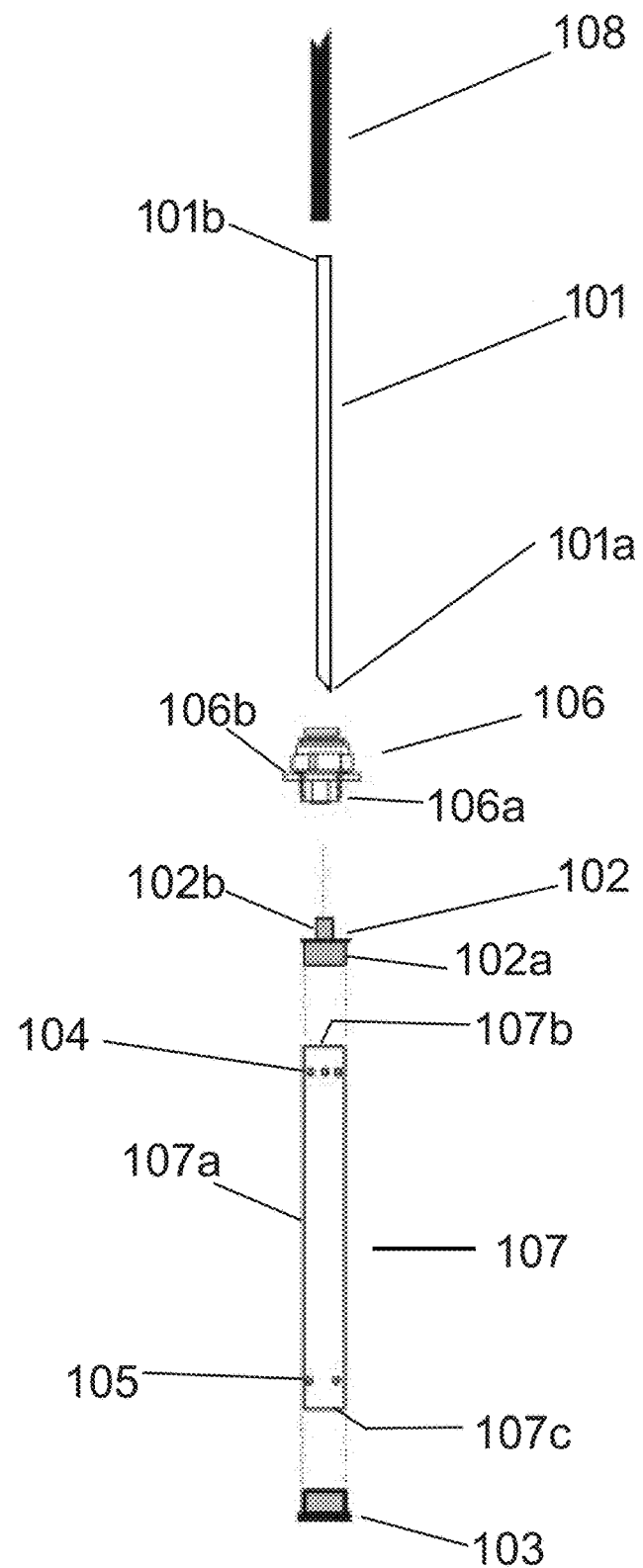
FIG. 1B shows an exploded view of the intermix regulator cartridge according to an embodiment of the present application.

The intermix regulator cartridge 100 of the present application will be described with reference to FIGS. 1A-6B.

In accordance with an embodiment of the present application, the intermix regulator cartridge 100 includes a chamber 107 having one or more air inlet holes 104 at an upper section of the chamber 107 and one or more particulate inlet holes 105 at a lower section of the chamber 107. The chamber 107 may include a longitudinal chamber wall 107a, and an upper opening 107b and a lower opening 107c. In the Figures, the chamber 107 is cylindrical, but may take other shapes in alternative embodiments of the cartridge 100. A first, upper cap 102 can be provided to substantially or entirely cover the upper opening 107b of the chamber 107 and a second, lower cap 103 can also be provided to substantially or entirely cover the lower opening 107c of the chamber 107. The upper cap 102 and lower cap 103 may be removable from the upper and lower openings 107b, 107c of the chamber 107, adhered or welded to the upper and lower openings 107b, 107c of the chamber 107, or may be formed integrally with the chamber 107.

A particulate pickup conduit 101 is arranged inside of the chamber 107, having a first terminus 101a that is arranged at the lower section of the chamber 107 in the vicinity of the particulate inlet holes 105. The particulate pickup conduit 101 includes a second terminus 101b that extends out of the chamber 107, terminating at and in communication with a delivery conduit 108. The delivery conduit 108 may be connected to or form part of a dispensing mechanism for dispensing a pressurized granulated material, such as a spraying device, a stylus and/or a nozzle (not shown). An example of such a stylus and nozzle arrangement can be found in applicant's earlier U.S. Pat. No. 10,239,185, which is hereby incorporated by reference in its entirety.

The intermix regulator cartridge 100 further may include a conduit cap 106 having a channel 106d therethrough. The conduit cap 106 may comprise an upper connection section that is configured to be connected to the delivery conduit 108 or dispensing mechanism, and a lower section comprising that is configured to receive the upper cap 102 in the channel 106d. The upper cap 102 may include a sealing element 102a that seals the upper opening 107b of the of the chamber 107 and a guide passage therethrough configured to receive the particulate pickup conduit 101, the guide passage having an upper cylinder 102b that is configured to be received in the channel 106d in the conduit cap 106. The conduit cap 106 may include a threaded section 106a that is configured to secure the intermix regulator cartridge 100 to a pressure chamber 200 having a corresponding threaded section 202. In alternative embodiments, the conduit cap 106 can have an alternative mechanism for connecting to a pressure chamber 200. The conduit cap 106 may also comprise a sealing element, such as a collar 106b and/or an O-ring 106c, to seal the pressure chamber 200.

Figure 2:
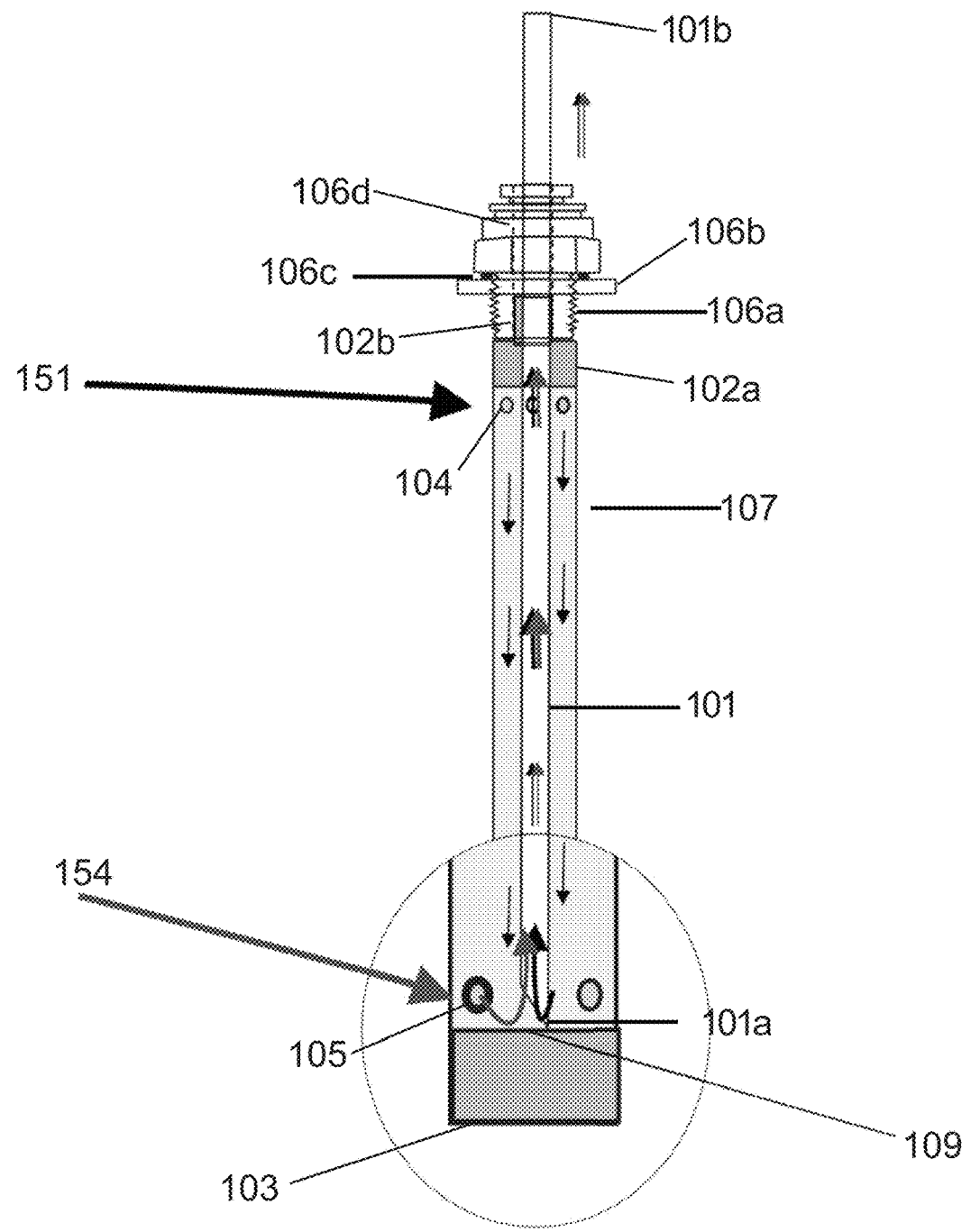
FIG. 2 shows a partial cross-sectional view of air/particle flow in the intermix regulator cartridge and out through the conduit.

As shown in FIG. 2, propellant 151 (identified with black arrows) enters the chamber 107 of the intermix regulator cartridge 100 through the air inlet holes 104. The base of the chamber 107 includes a mixing area 109 adjacent to the particulate inlet holes 105. In the mixing area 109, the propellant 151 in the chamber 107 and the particulate 154 (identified with gray arrows) taken into the chamber 107 mix and enter the particulate pickup conduit 101 at the lower terminus 101a. The air-particle mixture is then delivered upward through the particulate pickup conduit 101 towards the delivery conduit 108 of the stylus. In the embodiments illustrated in the Figures, there are more air inlet holes 104 (four holes) than particulate inlet holes 105 (two holes). The number, position, proportion and size of air inlet holes 104 and particulate inlet holes 105 can be modified in other embodiments depending on the appropriate proportion of propellant to particulate required for a particular application, as discussed further below.

Figure 3:
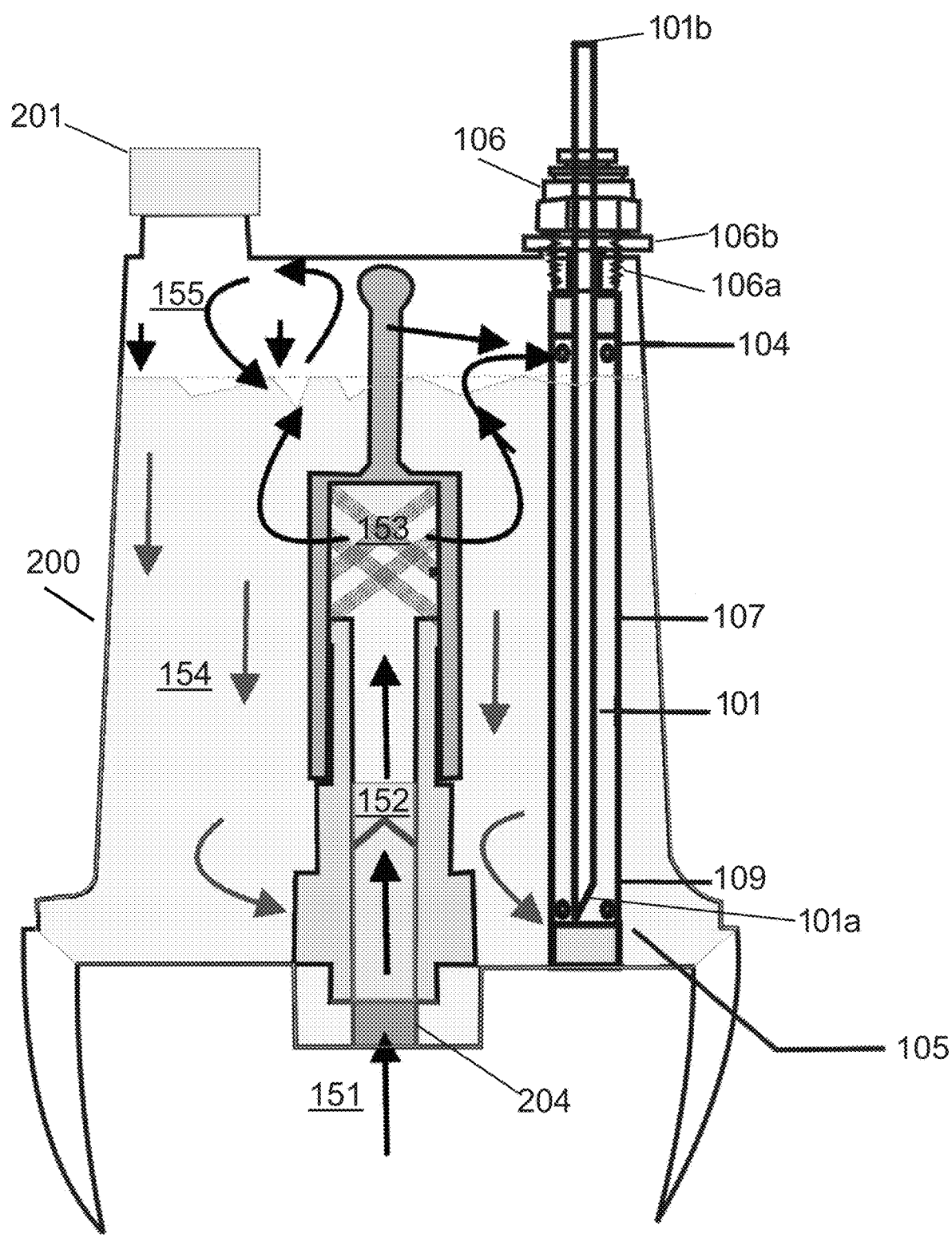
FIG. 3 shows a cross-sectional view of the intermix regulator cartridge in use in a functioning hopper containing abrasive.
Figure 4A:
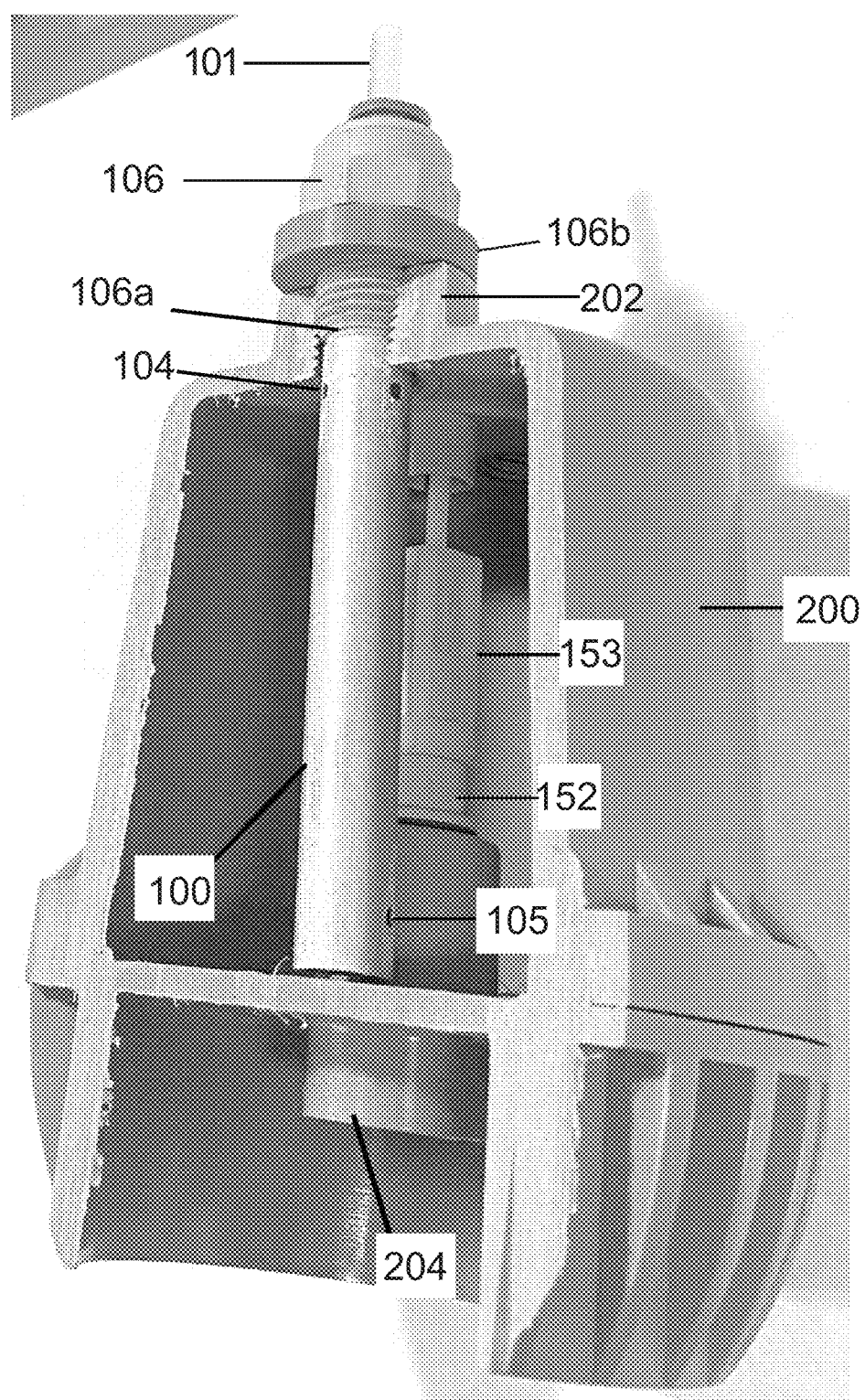
FIGS. 4A-4C show various partial cross-sectional views of the intermix regulator cartridge and pressure chamber according to embodiments of the present application.
Figure 4B:
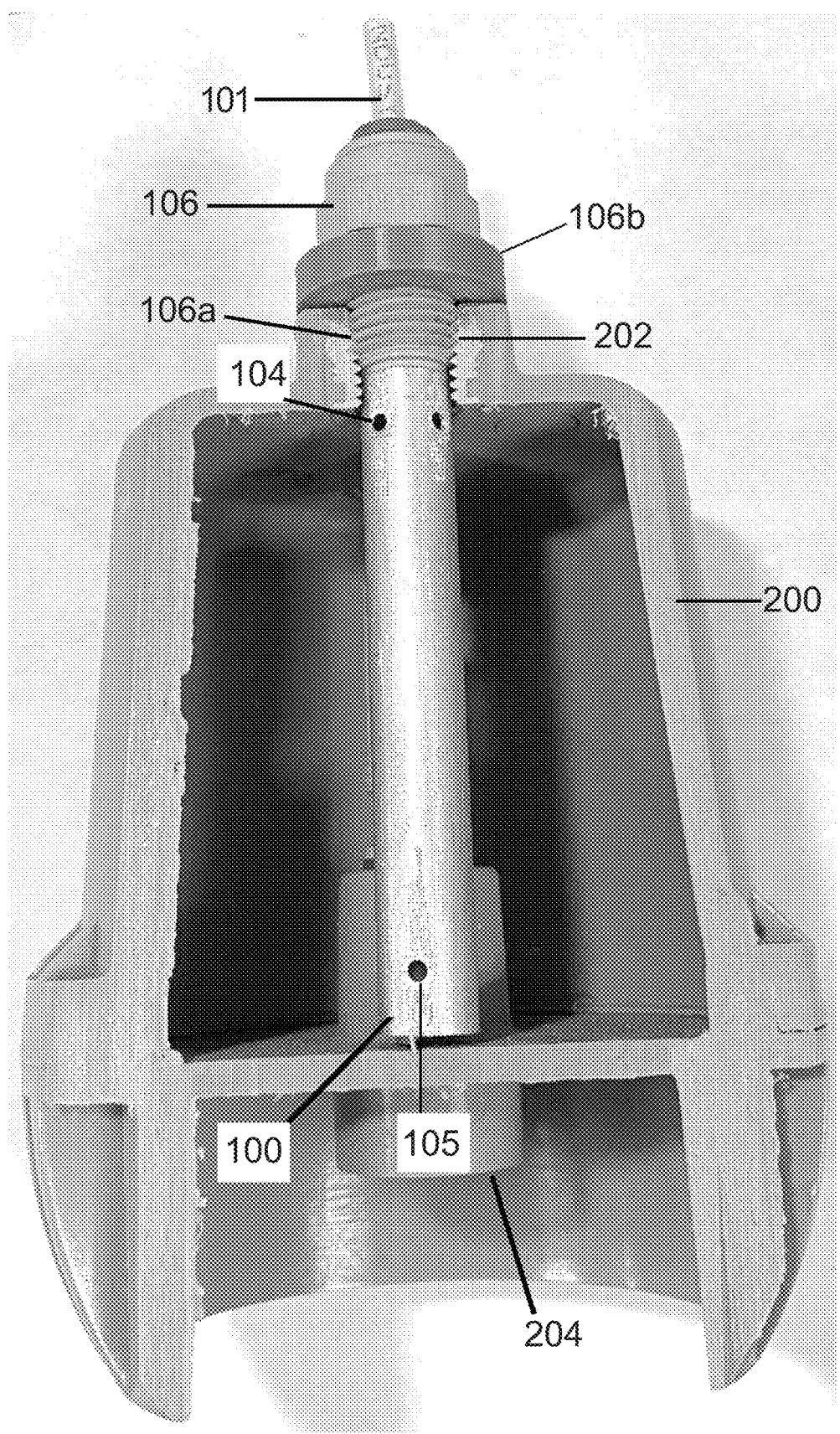
Figure 4C:
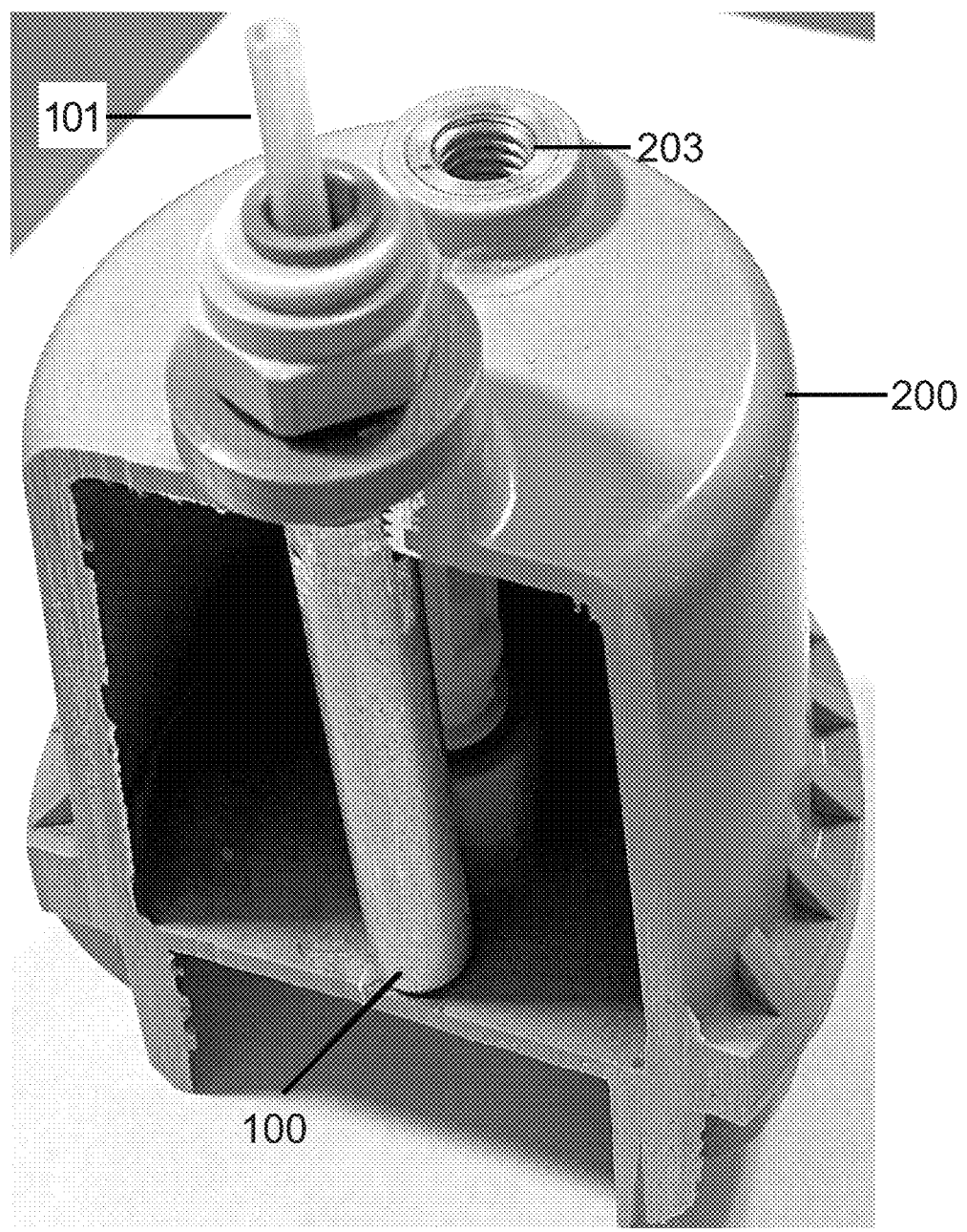

FIG. 3 shows an example operation of the intermix regulator cartridge 100 in combination with a pressure chamber 200 connected to a source (not shown) of pressurized air or propellant. The pressurized air source may include, for example, an aerosol spray can or a canister of pressurized air. Pressurized air or propellant 151 enters through a propellant conduit 204 in the base of the pressure chamber 200. In the embodiment shown in FIG. 3, upon entering the propellant conduit 204, the propellant 151 passes through a directional flow one way air valve 152 and through a fine particle filter 153 contained in the pressure chamber 200. In various embodiments, the pressure chamber 200 may be provided with either, neither or both of the valve 152 and filter 153. As propellant 151 enters the pressure chamber 200, it causes the ambient air pressure to increase. This increase in air pressure enables the intermix regulator cartridge to function.

The pressure chamber 200 includes a sealed and secured filler cap 201 covering a filler passage 203, which can be removed to add the particulates 154 to the pressure chamber 200 through the filler passage 203, and then secured to the pressure chamber 200 to seal the pressure chamber 200. The filler cap 201 and filler passage 203 may be threaded. In the embodiment shown in the Figures, the filler passage 203 includes threads within the filler passage 203 configured to receive a threaded section of the filler cap 201 therein. In alternative embodiments, the filler passage 203 may comprise external threading configured to receive threading on an interior of the filler cap 201. The particulates 154 is added to the pressure chamber 200 through the filler passage 203. The particulates 154 fill a containment area 155 of the pressure chamber 200 to a desired height, and a vacant space of the containment area 155 in the pressure chamber 200 above the fill height of the particulates 154 is also pressurized to above ambient pressure. The higher pressure of the vacant space in the containment area 155 pushes down on the particulates 154 in the containment area 155, and the particulates 154 travel to lower pressure areas, entering the intermix regulator cartridge 100 through the particulate inlet holes 105, and then enter the particulate pickup conduit 101.

The fill height of the particulate 154 in the pressure chamber 200 is preferably lower than the position of the air inlet holes 104 of the intermix regulator cartridge 100, as shown in FIG. 3. The propellant 151 in the vacant space in the pressure chamber 200 enters the chamber 107 of the intermix regulator cartridge 100 through the air inlet holes 104, as the propellant 151 travels towards areas of lower pressure. As previously described, the propellant 151 descends through the chamber 107 and mixes with the particulate 154 at the base of the chamber 107, and the mixture flows into the particulate pickup conduit 101 for dispensing.

Figure 5A:
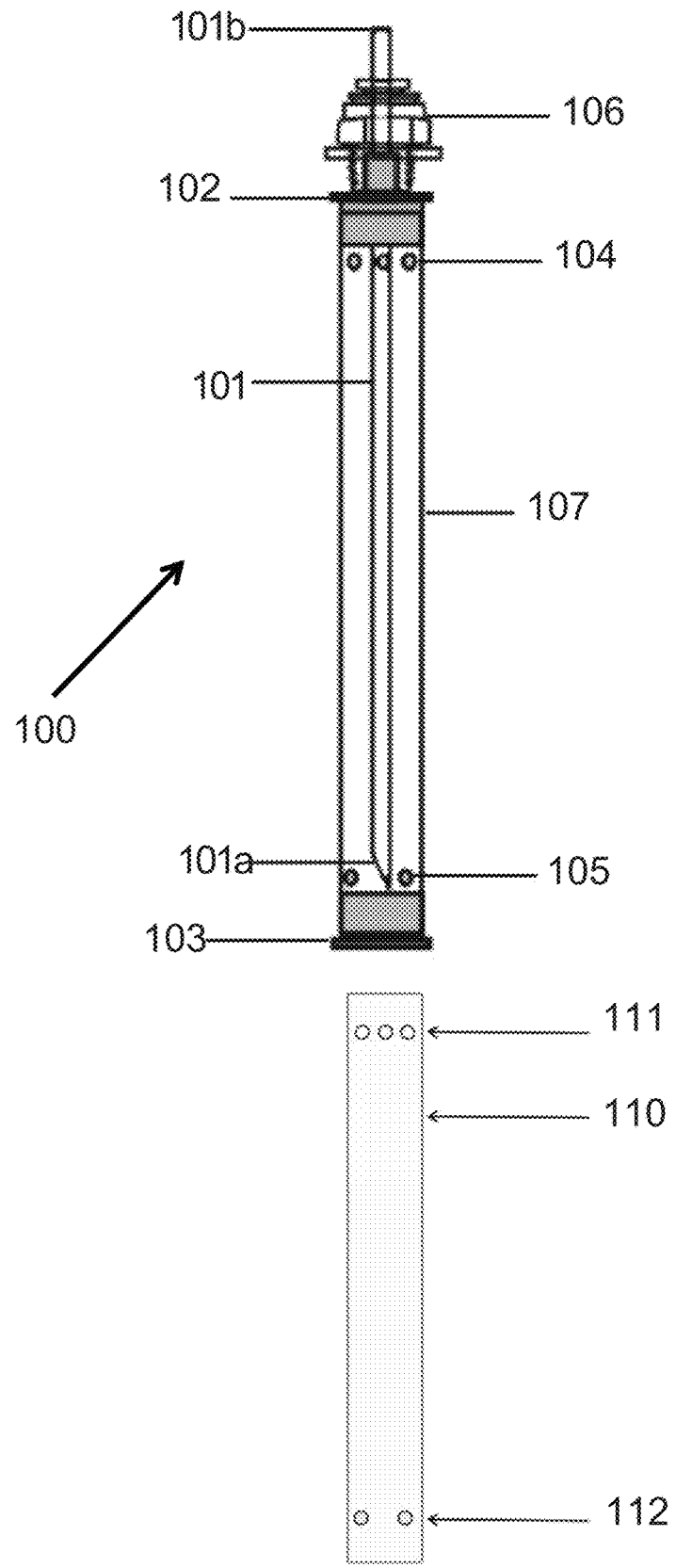
FIG. 5A shows a further embodiment of the intermix regulator cartridge comprising an external adjustment barrel according to the present application.
Figure 5B:
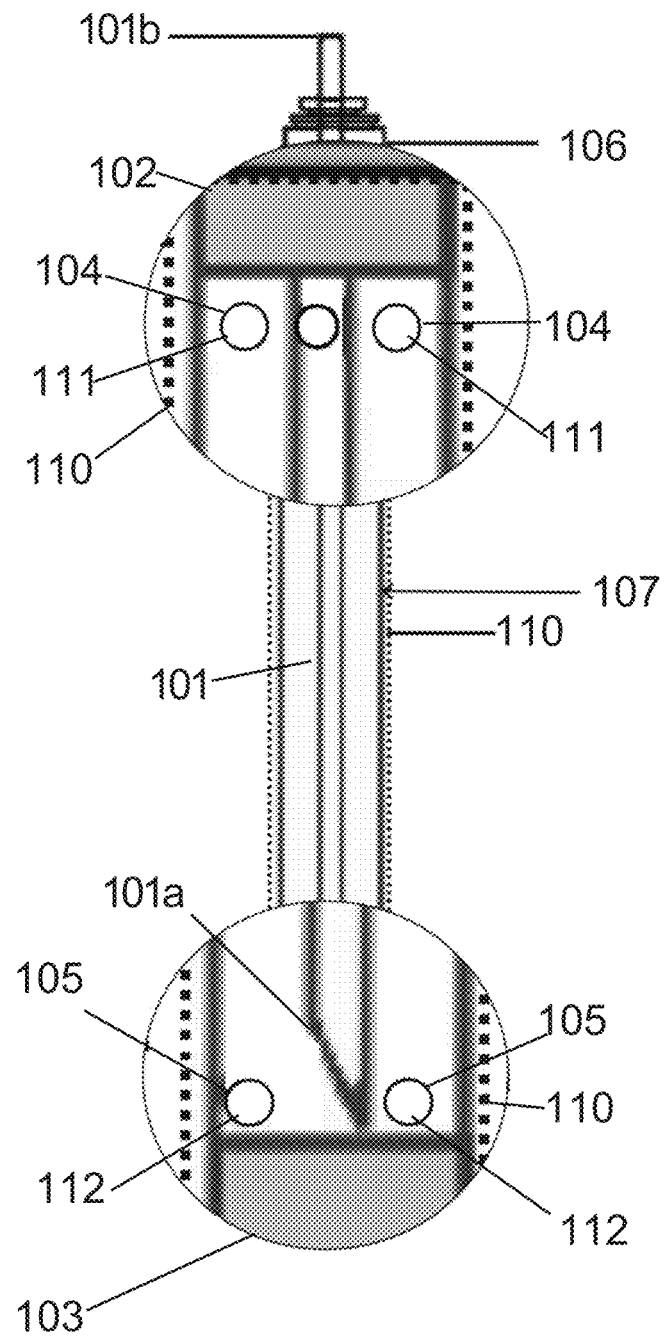
FIG. 5B shows the intermix regulator cartridge comprising the external adjustment barrel in an open alignment with the intermix regulator cartridge inlet holes according to the present application.
Figure 5C:
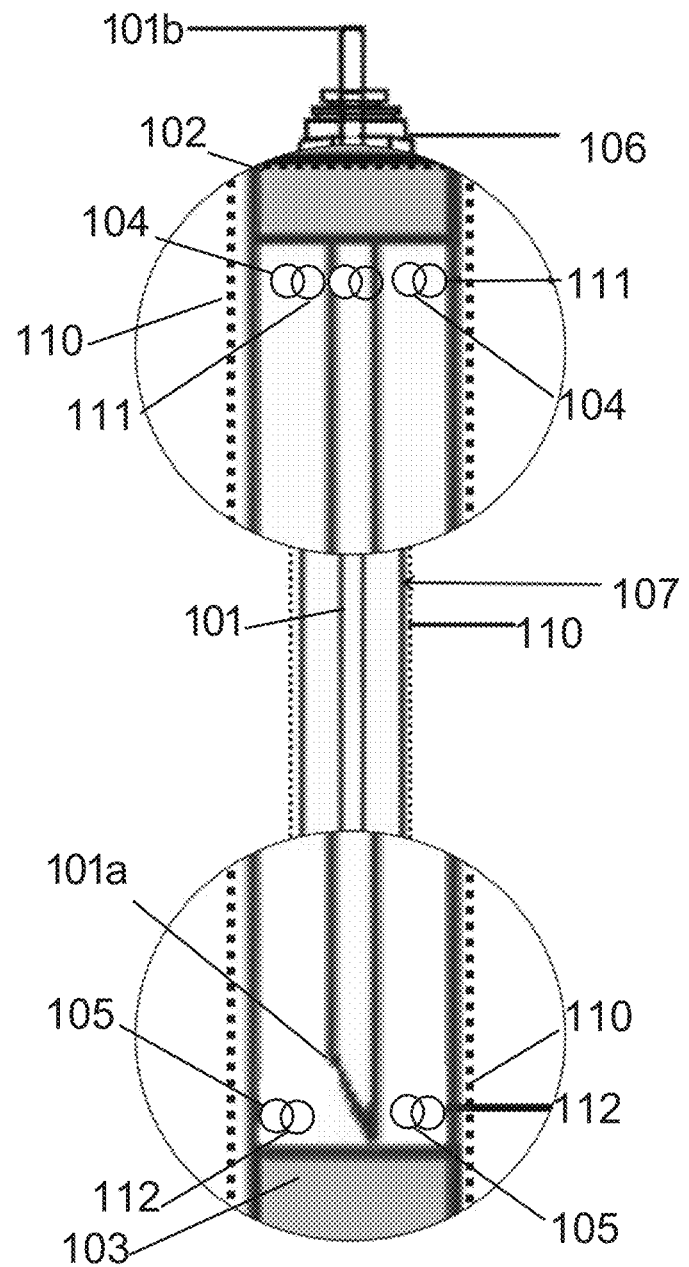
FIG. 5C shows the intermix regulator cartridge comprising the external adjustment barrel in a partially obstructed alignment with the intermix regulator cartridge inlet holes according to the present application.

In an additional embodiment, shown in FIGS. 5A-5C, an external adjustment barrel 110 can be provided, also including a set of air inlet holes 111 and a set of particulate inlet holes 112. The barrel 110 is dimensioned to fit over the chamber 107, and the barrel air inlet holes 111 and barrel particulate inlet holes 112 are provided in a number and size that is the same as the air inlet holes 104 and particulate inlet holes 105, and are spaced apart at the same distance so that the barrel air inlet holes 111 can overlap and align with the air inlet holes 104 and the barrel particulate inlet holes 112 can overlap and align with the particulate inlet holes 105.

As shown in FIG. 5B, when the barrel 110 is placed over the chamber wall 107a, the barrel 110 can be arranged so there is no obstruction to the air inlet holes 104 and particulate inlet holes 105, as they overlap with the barrel air inlet holes 111 and barrel particulate inlet holes 112. In this configuration, the barrel 110 allows a full abrasive flow into the chamber 107, and normal operation of the intermix regulator cartridge 100 is allowed.

When the barrel 110 is rotated a few degrees, as shown in FIG. 5C, the abrasive flow will be slightly interrupted thus allowing less abrasive to pass through into the intermix chamber 107. The barrel 110 is rotated from the arrangement shown in FIG. 5B so that the barrel air inlet holes 111 and barrel particulate inlet holes 112 only partially overlap with the air inlet holes 104 and particulate inlet holes 105 to the chamber 107, which restricts the size of openings into the chamber 107. By using this method, abrasive flow adjustment can be attained, allowing the user to adjust the rate of the flow of air and/or particulate that enters chamber 107, which exits via the particulate pickup conduit 101.

Figure 6A:
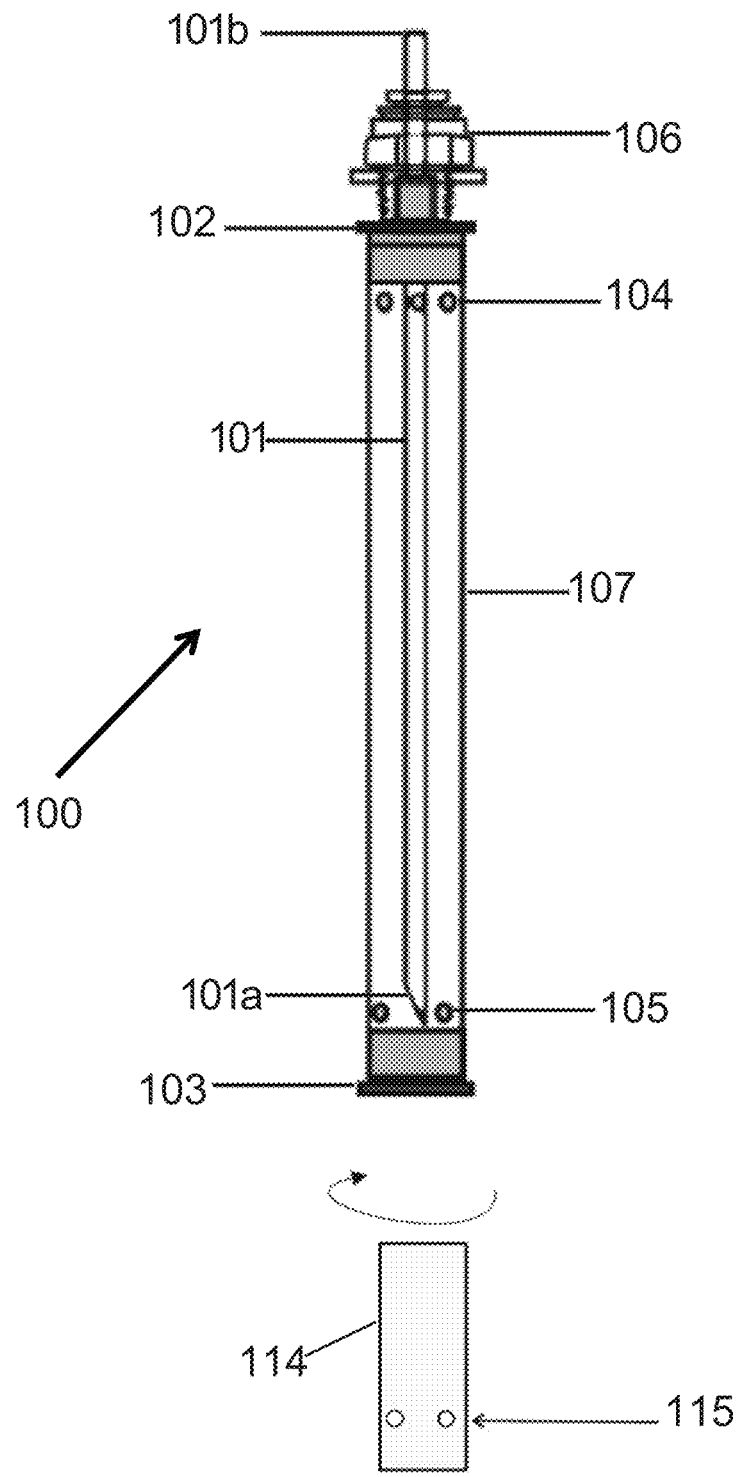
FIG. 6A shows a further embodiment of the intermix regulator cartridge comprising an external lower adjustment barrel according to the present application.
Figure 6B:
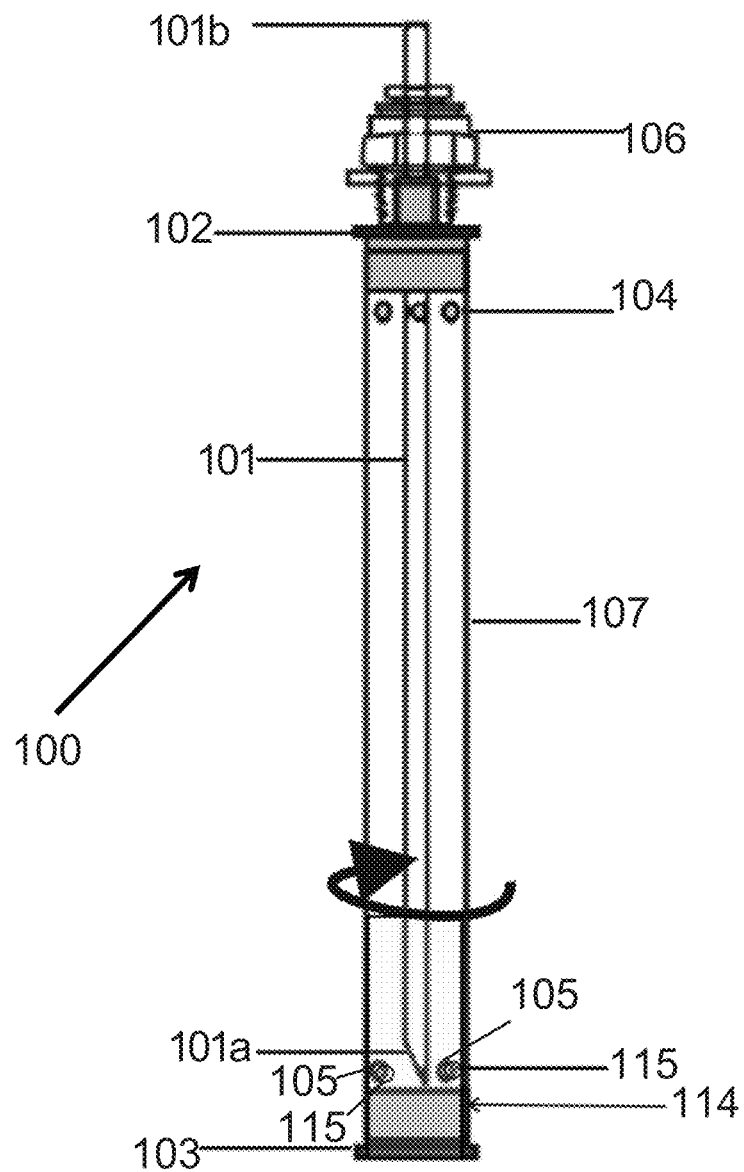
FIG. 6B shows the intermix regulator cartridge comprising the external lower adjustment barrel in a partially obstructed alignment with the intermix regulator cartridge inlet holes according to the present application.

FIGS. 6A-6B shows a further variation of the barrel 110, in the form of a shorter, external adjustment barrel 114 that is configured to only cover the lower portion of the intermix regulator cartridge 100. The barrel 114 includes a set of particulate inlet holes 115 provided in a number and size that is the same as the particulate inlet holes 105 and are spaced apart at the same distance so that the barrel particulate inlet holes 115 can overlap and align with the particulate inlet holes 105. In comparison to the barrel 110 in FIGS. 5A-5C, the shorter barrel 114 does not include an upper portion adjacent to the air inlet holes 104, so the air inlet holes 104 remain unobstructed at all times by the barrel 114. However, in other embodiments an upper barrel attachment can be provided also including a corresponding set of air inlet holes.

When the barrel 114 is placed over the chamber wall 107a, the barrel 114 can be arranged so there is no obstruction to the particulate inlet holes 105, as the barrel particulate inlet holes 115 overlap with the particulate inlet holes 105. In this configuration, the barrel 114 allows a full abrasive flow into the chamber 107, and normal operation of the intermix regulator cartridge 100 is allowed. When the barrel 114 is rotated a few degrees, as shown in FIG. 6B, the abrasive flow will be slightly interrupted thus allowing less abrasive to pass through into the intermix chamber 107. The barrel 114 is rotated from the arrangement that the barrel particulate inlet holes 115 only partially overlap with the particulate inlet holes 105 to the chamber 107, which restricts the size of openings into the chamber 107.

This variable adjustment allows greater abrasive flow control for varying projects and the desired end result. Adjustments are controlled by removing the intermix regulator cartridge 100 and rotating the external barrel 110 or 114, which is then reinstalled into the hopper 200.

As used herein, "propellant" may refer to any pressurized or compressed gas or liquid, particularly those suitable for use as a propellant. The particulates used in connection with the present application can include any particulate or abrasive material, including granular particulate matter, that is known in the art, such as silicon carbide or aluminum oxide. In one embodiment of the present application, the particulate used is aluminum oxide, which is a man-made material that is 100% inert, anti-allergenic, and environmentally safe. Other embodiments of the present invention may dispense materials such as sand, fine powder materials such as sugar or flour, or liquids.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. An apparatus comprising:
   a chamber comprising a first plurality of inlet holes and a second plurality of inlet holes; and
   a conduit arranged at least partially within the chamber having a first opening arranged in the chamber; and
   a threaded section configured to secure the apparatus to a container into which the chamber is inserted
   wherein the first plurality of inlet holes is configured to intake a first substance;
   wherein the second plurality of inlet holes is configured to intake a second substance; and
   wherein a mixture of the first and second substances is created within the chamber and the mixture enters the conduit through the first opening; and
   wherein the first plurality of inlet holes is arranged longitudinally between the threaded section and the second plurality of inlet holes.

2. The apparatus according to claim 1, wherein the chamber comprises a longitudinal wall having the first plurality of inlet holes and the second plurality of inlet holes formed therethrough.

3. The apparatus according to claim 2, wherein the chamber further comprises a first cap covering a lower portion of the chamber and a second cap covering an upper portion of the chamber.

4. The apparatus according to claim 1, further comprising a conduit cap comprising the threaded section thereon and disposed atop the chamber.

5. The apparatus according to claim 4, wherein the conduit cap comprises a channel therethrough configured to receive the conduit therein.

6. The apparatus according to claim 1, wherein the conduit comprises a second opening opposite the first opening and arranged outside of the chamber, the second opening configured to be connected to a delivery conduit.

7. An apparatus comprising:
   a chamber comprising a first plurality of inlet holes and a second plurality of inlet holes; and
   a conduit arranged at least partially within the chamber having a first opening arranged in the chamber;
   wherein the first plurality of inlet holes is configured to intake a first substance;
   wherein the second plurality of inlet holes is configured to intake a second substance;
   wherein a mixture of the first and second substances is created within the chamber and the mixture enters the conduit through the first opening;
   wherein the chamber comprises a longitudinal wall having the first plurality of inlet holes and the second plurality of inlet holes formed therethrough;
   wherein the chamber further comprises a first cap covering a lower portion of the chamber and a second cap covering an upper portion of the chamber; and
   wherein the second cap further comprises a cylindrical post extending from a surface of the second cap and comprising a passage therethrough through which the conduit passes.

8. An apparatus comprising:
   a chamber comprising a first plurality of inlet holes and a second plurality of inlet holes; and
   a conduit arranged at least partially within the chamber having a first opening arranged in the chamber;
   wherein the first plurality of inlet holes is configured to intake a first substance;
   wherein the second plurality of inlet holes is configured to intake a second substance;
   wherein a mixture of the first and second substances is created within the chamber and the mixture enters the conduit through the first opening;
   wherein the chamber comprises a longitudinal wall having the first plurality of inlet holes and the second plurality of inlet holes formed therethrough; and
   wherein the apparatus further comprises an external barrel positioned over the longitudinal wall comprising a first plurality of barrel inlet holes, wherein the external barrel is configured for rotation about the chamber between a first position in which the first plurality of barrel inlet holes overlap with the first plurality of inlet holes and a second position in which the first plurality of barrel inlet holes do not overlap with the first plurality of inlet holes.

9. The apparatus according to claim 8, wherein the external barrel further comprises a second plurality of barrel inlet holes, wherein in the first position the second plurality of barrel inlet holes overlap with the second plurality of inlet holes and in the second position the second plurality of barrel inlet holes do not overlap with the second plurality of inlet holes.

10. A system comprising:
    a first chamber comprising:
       a propellant conduit configured to receive a propellant substance; and
       a containment area configured to hold a particulate substance; and an apparatus inserted into the first chamber and comprising:
a second chamber comprising a first plurality of inlet holes and a second plurality of inlet holes; and
a conduit arranged at least partially within the second chamber having a first opening arranged in the second chamber;
wherein the first plurality of inlet holes is configured to intake the propellant substance into the second chamber;
wherein the second plurality of inlet holes is configured to intake the particulate substance into the second chamber;
wherein a mixture of the propellant substance and the particulate substance is created within the second chamber and the mixture enters the conduit through the first opening; and
wherein the apparatus further comprises a conduit cap configured to secure the apparatus to the first chamber; and the conduit cap comprises:
a channel therethrough configured to receive the conduit therein; and
one or more sealing elements arranged outside of the first chamber configured to provide a seal of the containment area of the first chamber.

11. The system according to claim 10, wherein the apparatus further comprises a threaded section configured to secure the apparatus to the first chamber, the first chamber comprising a corresponding threaded section.

12. The system according to claim 10, wherein the first plurality of inlet holes and the second plurality of inlet holes are both disposed within the containment area of the first chamber.

13. The system according to claim 10, wherein the second chamber further comprises a longitudinal wall having the first plurality of inlet holes and the second plurality of inlet holes formed therethrough.

14. The system according to claim 10, wherein the propellant conduit is configured to be connected to a pressurized gas source and the propellant substance is the pressurized gas.

15. A system comprising:
a first chamber comprising:
a propellant conduit configured to receive a propellant substance; and
a containment area configured to hold a particulate substance; and
an apparatus inserted into the first chamber and comprising:
a second chamber comprising a first plurality of inlet holes and a second plurality of inlet holes; and
a conduit arranged at least partially within the second chamber having a first opening arranged in the second chamber;
wherein the first plurality of inlet holes is configured to intake the propellant substance into the second chamber;
wherein the second plurality of inlet holes is configured to intake the particulate substance into the second chamber; and
wherein a mixture of the propellant substance and the particulate substance is created within the second chamber and the mixture enters the conduit through the first opening; and
wherein the first plurality of inlet holes is disposed adjacent to a first end of the second chamber arranged in a lower portion of the containment area, and the second plurality of inlet holes are disposed adjacent to a second end of the second chamber arranged in an upper portion of the containment area.

16. A system comprising:
a first chamber comprising:
a propellant conduit configured to receive a propellant substance; and
a containment area configured to hold a particulate substance; and
an apparatus inserted into the first chamber and comprising:
a second chamber comprising a first plurality of inlet holes and a second plurality of inlet holes; and
a conduit arranged at least partially within the second chamber having a first opening arranged in the second chamber;
wherein the first plurality of inlet holes is configured to intake the propellant substance into the second chamber;
wherein the second plurality of inlet holes is configured to intake the particulate substance into the second chamber;
wherein a mixture of the propellant substance and the particulate substance is created within the second chamber and the mixture enters the conduit through the first opening; wherein the propellant conduit is configured to be connected to a pressurized gas source and the propellant substance is the pressurized gas, and
wherein the first chamber further comprises:
a one-way flow valve adjacent to the propellant conduit configured to prevent flow of the propellant substance towards the pressurized gas source; and
a filter configured to filter the propellant substance from the pressurized gas source.

* * * * *